(12) United States Patent
Karnik

(10) Patent No.: US 10,812,595 B2
(45) Date of Patent: Oct. 20, 2020

(54) REMOTE CONTROL OF A MOBILE COMMUNICATION DEVICE

(71) Applicant: Mastercard International Incorporated, Purchase, NY (US)

(72) Inventor: Ajit Karnik, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 90 days.

(21) Appl. No.: 16/178,660

(22) Filed: Nov. 2, 2018

(65) Prior Publication Data

US 2019/0141136 A1    May 9, 2019

(30) Foreign Application Priority Data

Nov. 6, 2017  (SG) ............................ 10201709140X

(51) Int. Cl.
| | |
|---|---|
| *H04L 29/08* | (2006.01) |
| *H04W 88/04* | (2009.01) |
| *H04W 12/06* | (2009.01) |
| *H04W 88/02* | (2009.01) |
| *H04L 29/06* | (2006.01) |
| *H04W 12/08* | (2009.01) |
| *H04W 84/20* | (2009.01) |

(52) U.S. Cl.
CPC .......... *H04L 67/125* (2013.01); *H04L 63/083* (2013.01); *H04L 63/0876* (2013.01); *H04W 12/06* (2013.01); *H04W 12/08* (2013.01); *H04W 88/023* (2013.01); *H04W 88/04* (2013.01); *H04W 84/20* (2013.01)

(58) Field of Classification Search
CPC . H04L 67/125; H04L 63/0876; H04L 63/083; H04W 12/08; H04W 88/023; H04W 12/06; H04W 88/04; H04W 84/20
See application file for complete search history.

(56) References Cited

U.S. PATENT DOCUMENTS

2001/0039623 A1\* 11/2001 Ishikawa ................. H04L 12/12
726/23
2020/0021593 A1\* 1/2020 Pognant .................. H04L 63/20

\* cited by examiner

*Primary Examiner* — Afshawn M Towfighi
(74) *Attorney, Agent, or Firm* — Hovey Williams LLP

(57) ABSTRACT

According to a first aspect, there is provided a mobile communication device programmable into a slave mode for remote control by a master mobile communication device, the mobile communication device comprising: at least one processor; at least one memory including computer program code; and a communication port coupled to the processor the at least one memory and the computer program code configured to, with the at least one processor, cause the mobile communication device at least to: receive, through the communication port, a signal effected by the master mobile communication device to initialise remote control of the mobile communication device; establish an identity of the master mobile communication device in response to reception of the signal; determine whether the identity is registered in a database containing identities that are authorised to gain remote control of the mobile communication device; detect, upon successful identity determination, whether the signal is paired with an access code granting remote control of the mobile communication device; validate the detected access code; and grant remote control of the mobile communication device to the master mobile communication device after successful validation of the detected access code.

14 Claims, 7 Drawing Sheets

REMOTE CONTROL OF A MOBILE COMMUNICATION DEVICE

CROSS REFERENCE TO RELATED APPLICATIONS

This application claims priority to Singaporean Application Serial No. 10201709140X, filed Nov. 6, 2017, which is incorporated herein by reference in its entirety.

TECHNICAL FIELD

The following discloses a system that allows remote control of a mobile communication device and a method to effect the remote control.

BACKGROUND

Smartphones are now used for a wide range of functions including calls, messages, appointments, conferences, banking & payment applications, tickets & boarding passes, and for access stored important information.

Consequently, consumers are increasingly dependent on them. Not having access to the phone can be challenging, and at times, even critical. If a mobile phone is left at home, its owner would have to go back to take it, or spend the day missing out on important calls, emails, text messages, stored information, access to key applications such as making digital payments, banking, booking tickets, and important information such as images, boarding passes and stored QR codes. The phone may also contain contact details and or other key information that is critically required for the user to accomplish tasks.

Instead of returning to get the mobile phone, one way to obtain any information is to remotely access it. For example, TeamViewer® provides a remote control application which when installed in two mobile phones, allows one of them (the master phone) to remote control the other (the slave phone). The master phone is granted the remote control access if it correctly provides an identifier assigned to the slave phone and a randomly generated access password. The Windows® operating system has a remote desktop connection feature that allows for a computer (slave computer) to be remotely accessed by multiple computers (master computers). The slave computer has to be manually configured to allow a port to communicate with a master computer. The port assigned to the master computer and the IP address of the slave computer is specified in a router that the master computer uses to connect to the slave computer. When the slave computer detects that access is being sought by the master computer through the assigned port, the slave computer requests for credentials from the master computer before granting the remote control access.

The remote control application software provided by TeamViewer® requires for a user to remember the identifier assigned to the slave phone, while the remote desktop connection feature packaged with Windows requires several configuration steps. Both also do not allow a landline phone to gain remote control of a mobile phone. The present disclosure describes means to alleviate these shortcomings.

Other desirable features and characteristics will become apparent from the subsequent detailed description and the appended claims, taken in conjunction with the accompanying drawings and this background of the present disclosure.

SUMMARY OF THE INVENTION

According to a first aspect, there is provided a mobile communication device programmable into a slave mode for remote control by a master mobile communication device, the mobile communication device comprising: at least one processor; at least one memory including computer program code; and a communication port coupled to the processor the at least one memory and the computer program code configured to, with the at least one processor, cause the mobile communication device at least to: receive, through the communication port, a signal effected by the master mobile communication device to initialise remote control of the mobile communication device; establish an identity of the master mobile communication device in response to reception of the signal; determine whether the identity is registered in a database containing identities that are authorised to gain remote control of the mobile communication device; detect, upon successful identity determination, whether the signal is paired with an access code granting remote control of the mobile communication device; validate the detected access code; and grant remote control of the mobile communication device to the master mobile communication device after successful validation of the detected access code.

According to a second aspect, there is provided a method to effect remote control of a mobile communication device programmable into a slave mode by a master mobile communication device, the method comprising receiving a signal effected by the master mobile communication device to initialise remote control of the mobile communication device; establishing an identity of the master communication device in response to reception of the signal; determining whether the identity is registered in a database of the mobile communication device, the database containing identities that are authorised to gain remote control of the mobile communication device; detecting, upon successful identity determination, whether the signal is paired with an access code granting remote control of the mobile communication device; validating the detected access code; and granting remote control of the mobile communication device to the master mobile communication device after successful validation of the detected access code.

According to a third aspect, there is provided a mobile communication device programmable into a master mode to remote control a slave mobile communication device, the mobile communication device comprising: at least one processor; at least one memory including computer program code; and a communication port coupled to the processor, the at least one memory and the computer program code configured to, with the at least one processor, cause the mobile communication device at least to: transmit, through the communication port, a signal to initialise remote control of the slave mobile communication device; pair the signal with an access code granting remote control of the slave mobile communication device; receive a notification of grant of the remote control after validation of the access code by the slave communication device; and access an operating system of the slave mobile communication device through input entered in any one of: an interactive voice response menu, a graphic user interface, or directly on a desktop of the operation system of the slave mobile communication device.

According to a fourth aspect, there is provided a non-transitory computer readable medium for storing a program that when installed into a mobile communication device programs the mobile communication device into a slave mode for remote control by a master mobile communication device, wherein the mobile communication device is configured to receive a signal effected by the master mobile communication device to initialise remote control of the mobile communication device; establish an identity of the master mobile communication device in response to reception of the signal; determine whether the identity is registered in a database containing identities that are authorised to gain remote control of the mobile communication device; detect, upon successful identity determination, whether the signal is paired with an access code granting remote control of the mobile communication device; validate the detected access code; and grant remote control of the mobile communication device to the master mobile communication device after successful validation of the detected access code.

According to a fifth aspect, there is provided a mobile communication device programmable into a slave mode for remote control by a master mobile communication device, the mobile communication device comprising: at least one processor; at least one memory including computer program code; and a communication port coupled to the processor the at least one memory and the computer program code configured to, with the at least one processor, cause the mobile communication device at least to: receive, through the communication port, a signal effected by the master mobile communication device to initialise remote control of the mobile communication device, the signal resulting from the making of a phone call or the sending of a message from the master mobile communication device to the mobile communication device; establish an identity of the master mobile communication device in response to reception of the signal; determine whether the identity is registered in a database containing identities that are authorised to gain remote control of the slave mobile communication device; detect, upon successful identity determination, for presence of an access code granting remote control of the mobile communication device in either the signal or separately received from the master mobile communication device; validate the detected access code by determining whether the detected access code matches a stored access code in respect of the registered identity; and grant remote control of the mobile communication device to the master mobile communication device after successful validation of the detected access code.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the invention are described hereinafter with reference to the following drawings, in which.

DETAILED DESCRIPTION

Overview

Figure 1:
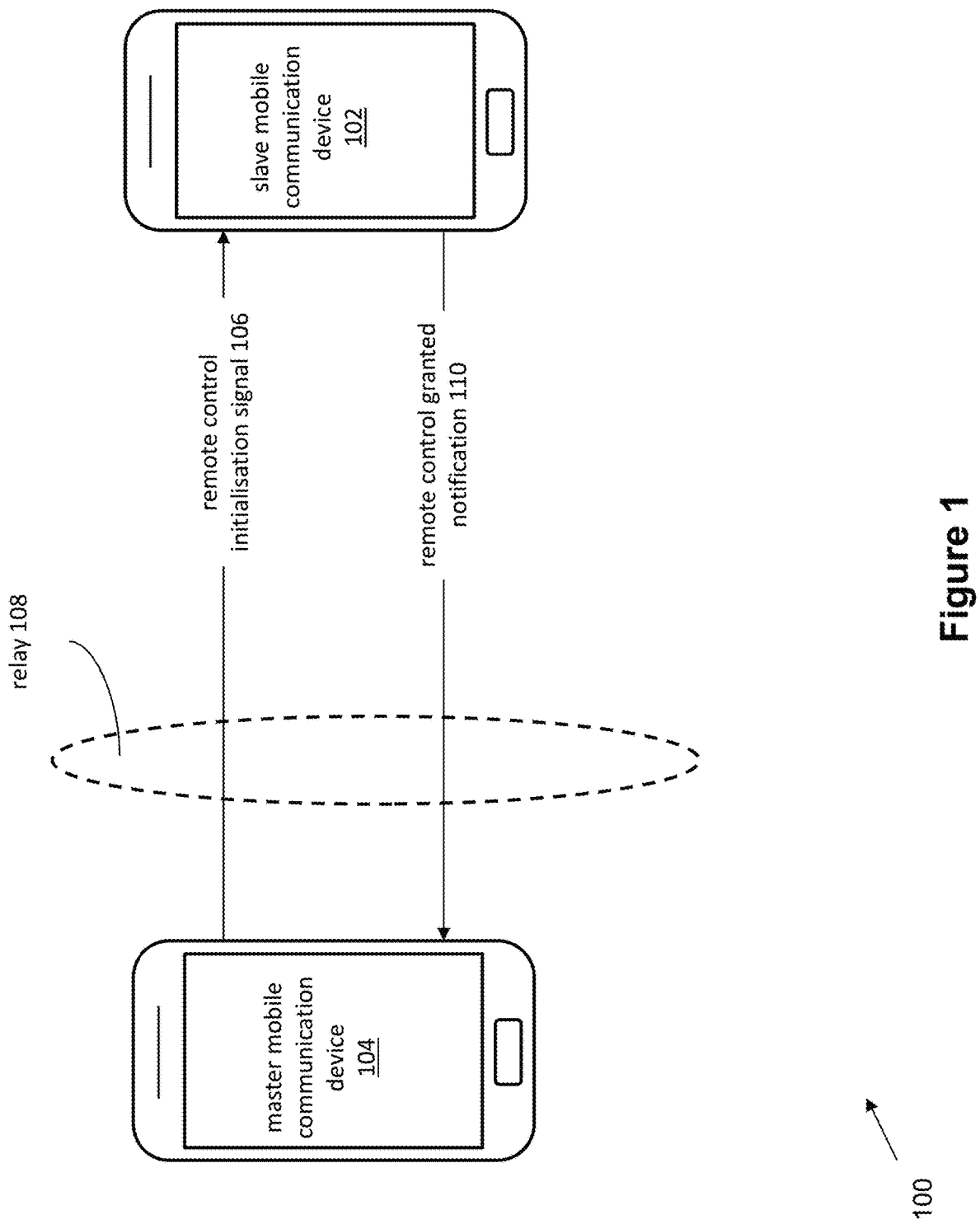
FIG. 1 shows a schematic of a system which supports remote control of a slave mobile communication device by a master mobile communication device.

Various embodiments of present disclosure provide a method and a system that allows a mobile communication device to be remotely controlled, i.e. a controlling device can connect to and control the operation of the mobile communication device. The remote controlled communication device is called the slave mobile communication device, while the controlling device is called the master mobile communication device.

Remote control of the slave mobile communication device is granted only to authorised master mobile communication devices. Authorised master mobile communication devices have their identity details registered with the slave mobile communication device so that the slave mobile communication device can recognise the master mobile communication device. Such recognition is a minimum requirement before remote control of the slave mobile communication device is granted to the master mobile communication device. A further minimum requirement is that the master mobile communication device provides to the slave mobile communication device an access code that then grants the remote control to the master mobile communication device, the access code also similarly being registered with the slave mobile communication device as being linked to the identity details of the master mobile communication device.

There are several ways in which the identity of the master mobile communication device is registered with an authorisation list maintained by the slave mobile communication device, and subsequently granted remote control of the slave mobile communication device.

When the identity detail is a telephone number, a first approach has the telephone number from which the master mobile communication device calls entered into a user interface provided by the slave mobile communication device. The telephone number is then entered into a database used to record identity details of master mobile communication devices that are allowed remote control of the slave mobile communication device. During the registration of the telephone number, an access code to gain remote control of the slave mobile communication device is entered.

In a second approach, the identity detail is also a telephone number, but it is not registered into the slave mobile communication device by being entered into the user interface provided by the slave mobile communication device. Rather, the slave mobile communication device is provided with a registration code that the slave mobile communication device is configured to detect is embedded in a message. When the slave mobile communication device receives a message containing the registration code, the slave mobile communication device will recognise that the message is seeking to register the telephone number of a master mobile communication device that can gain remote control of the slave mobile communication device. In one implementation, the telephone number of the master mobile communication device is provided in the message containing the registration code or in a subsequent message. In another implementation, where the sender of the message containing the registration code is meant to be a master mobile communication device, the telephone number of the sender is automatically detected by caller ID (identifier). The message containing the registration code has data entries that indicate to the slave mobile communication device which of the above implementations is sought. The sender of the message containing the registration code is notified of the successful identity registration, whereby the access code that the master mobile communication device uses when requesting grant of remote control of the slave mobile communication device can then be sent to the slave mobile communication device.

From the above, a smart phone owner who has forgotten their smart phone can still access their smart phone remotely. The extent of the access depends on the device that the owner uses to connect to their smart phone. For instance if the owner uses his office landline phone, the degree of access is confined to information that can be dictated from the smart phone to the office landline phone. On the other hand, if the device that the owner uses to connect to their smart phone is also another smart phone, a total degree of access may be possible, i.e. as if the remote controlled forgotten phone is on hand.

The present disclosure therefore provides a means for an owner, who has forgotten to bring along their smart phone to still be able to access data stored and applications running in their smart phone. Remote control provided by various embodiments of the present disclosure differ from existing remote control applications as follows. The slave mobile communication device runs an application that supports the remote control, whereby the application is by default in a dormant state until the application detects that slave mobile communication device is contacted by a master mobile communication device that is registered with the slave mobile communication device to be able to gain remote control of the slave communication device. Accordingly, this is advantageous since it would be difficult for the owner to start the application when they have forgotten to bring along their smart phone. The second approach, discussed above, of registering the identity of a new master mobile communication device makes it possible to add a new controlling communication device on the fly, so that the owner is not restricted to using only master mobile communication devices that are pre-registered when their smart phone was with them. In addition, should the owner not be able to avail themselves to a smart phone, at least they can still use a landline phone to access critical data stored in their forgotten smart phone.

Terms Description (in Addition to Dictionary Meaning of Terms)

A mobile communication device refers to an electronic device having telecommunication capability, such as a telephone configured to perform one or more of: able to make or receive telephone calls; send or receive a short message service (SMS); transmit or receive data packets to Internet websites, over wireless cellular networks. The mobile communication device is typically a smartphone or an electronic tablet having an operating system. The operating system hosts one or more mobile applications, including one that is configured to have the mobile communication device be programmed into a slave mode, where the mobile communication device then becomes a slave mobile communication device; or a master mode, where the mobile communication device then becomes a master mobile communication device. During a remote control session, the slave mobile communication device is remotely controlled by the master mobile communication device. The present disclosure provides for one implementation where the master mobile communication device is a landline telephone that connects to the slave mobile communication device through a telephone exchange.

Signal refers to any kind of electrical wave that carries information which can initiate remote control of the slave mobile communication device. This information refers to the necessary data fields whose presence the slave mobile communication device is configured to detect as part of a sequence of steps that the slave mobile communication device is required to undertake before granting remote control. These necessary data fields include an identity of the master mobile communication device, such as its phone number. Accordingly, the signal can be thought of as an electrical wave that carries an identifier of the master mobile communication device and need not necessarily contain a command for remote control to be ceded to the master mobile communication device. This signal is also effected by the master mobile communication device, since in the case where the master mobile communication device is a wireless communication device, the signal may be relayed from a base station.

The identity of the master mobile communication device refers to data that can be used to identify the master mobile communication device, whereby this identity is used to locate a match in the database containing identities that are authorised to gain remote control of the slave mobile communication device. A match leads to successful identity determination, i.e. the master mobile communication device that effected the signal received by the slave mobile communication device can be granted remote control of the slave mobile communication device after clearing all other checks.

Access code refers to a password that the master mobile communication device has to supply to the slave mobile communication device before the remote control is granted. The access code is a sequence having one or more of symbols, letters and digits.

Paired refers to whether the signal is used together with the access code. In one implementation, the access code is included in a data packet that is separate to the signal that initiates remote control of the slave mobile communication device, whereby the slave mobile communication device is configured to expect receipt of this data packet. Upon receipt of this data packet, the slave mobile communication device will draw a connection with the extracted access code and the identity obtained from the signal, even though they are separately received. In another implementation, the access code is also contained in the signal that initiates remote control of the slave mobile communication device, so that the signal provides both an identity of the master mobile communication device and the password to unlock the remote control.

Validate refers to verifying whether the access code matches an access code that is registered with the identity of the master mobile communication device.

Exemplary Embodiments

Embodiments of the present invention will be described, by way of example only, with reference to the drawings.

Like reference numerals and characters in the drawings refer to like elements or equivalents.

FIG. 1 shows a schematic of a system 100 which supports remote control of a slave mobile communication device 102 by a master mobile communication device 104 after a connection is established between the slave mobile communication device 102 and the master mobile communication device 104. It will be appreciated that both the devices 102 and 104 are initially in normal operation modes and only enter into their respective slave and master modes after a remote control connection session is established. However, for simplicity of discussion, the two devices 102 and 104 are each respectively referenced as the slave mobile communication device 102 and the master mobile communication device 104 from the onset.

The master mobile communication device 104 may connect with the slave mobile communication device 102 through a relay 108. This relay 108 serves to establish a communication path between the master mobile communication device 104 and the slave mobile communication device 102 and routes communication signals between the two devices 102 and 104. The relay 108 may either be a network of cellular base stations in the scenario where both the devices 102 and 104 are mobile phones or a telephone exchange where the master mobile communication device 104 is a landline phone.

In the system 100, the slave mobile communication device 102 refers to a mobile phone that an owner forgets to bring, while the master mobile communication device 104 refers to a readily available phone that the owner uses to access his forgotten mobile phone. Such a scenario occurs, for example, when the owner inadvertently leaves their mobile phone at home when going to the office or the owner inadvertently leaves their mobile phone at the office when going home.

In implementations discussed below where both the master mobile communication device 104 and the slave mobile communication device 102 are smart phones, each hosts an application that allows for a connection to be established between the master mobile communication device 104 and the slave mobile communication device 102. The established connection allows the master mobile communication device 104 to remotely control the slave mobile communication device 102.

The application may specifically be loaded and installed by the owner of the slave mobile communication device 102. Alternatively, the application may be embedded in the operating system of the slave mobile communication device 102, so that it forms an integral part of the slave mobile communication device 102 and is a standard feature of the slave mobile communication device 102.

With respect to the slave mobile communication device 102, the application may be in a dormant state, i.e. it runs in the background, without impacting any of the slave mobile communication device 102 functions including the running of other applications. The application remains dormant as it detects for the slave mobile communication device 102 to receive a request from a master mobile communication device that is authorized to gain remote control of the slave mobile communication device 102.

Deciding whether the master mobile communication device 104 can be granted remote control of the slave mobile communication device 102 involves two stages. In the first stage, the user details of the master mobile communication device 104 are verified. In the second stage, the password details provided by the master mobile communication device 104 are verified.

The first stage begins with the slave mobile communication device 102 receiving a remote control initialisation signal 106, being a signal effected by the master mobile communication device 104 to initialise remote control of the slave mobile communication device 102. This signal 106 carries an identifier of the master mobile communication device 104, whereby this signal 106 is created by, for example, the master mobile communication device 104 making a phone call to the slave mobile communication device 102; or the master mobile communication device 104 sending a SMS to the slave mobile communication device 102 having content that conveys to the master mobile communication device 104 that remote control is sought.

The next step of the first stage has the slave mobile communication device 102 establishing an identity of the master mobile communication device 104 in response to reception of the signal 106. That is, when the slave mobile communication device 102 receives a call or a SMS, it will determine the source of the call or the SMS. For instance, the slave mobile communication device 102 may use a caller ID function to ascertain the telephone number of the master mobile communication device 104 that has made the call or sent the SMS.

The final step of the first stage has the slave mobile communication device 102 determine whether the identity of the master mobile communication device 104 is registered in a database containing identities that are authorised to gain remote control of the slave mobile communication device 102. This determination is performed by checking whether the identity of the master mobile communication device 104 matches a stored identity in this database of the slave mobile communication device 102.

The second stage, verify the password details provided by the master mobile communication device 104, can commence after successful identity determination of the master mobile communication device 104, i.e. it is verified that the master mobile communication device 104 is indeed authorised to gain remote control of the slave mobile communication device 102. It is also at this second stage that the application allowing for a connection to be established between the master mobile communication device 104 and the slave mobile communication device 102 becomes active from its dormant state.

The second stage begins with detecting whether the signal 106 is paired with an access code granting remote control of the slave mobile communication device 102. Thus, the access code is synonymous with a password which has to validated before remote control of the slave mobile communication device 102 is granted. The pairing check has the slave mobile communication device 102 detecting whether the signal 106 is used together with the access code, such as whether the access code is embedded in the signal 106.

The next step of the second stage has the slave mobile communication device 102 validate the detected access code. This is performed, for example, by the slave mobile communication device 102 processing the detected access code against the database mentioned above with respect to the final step of the first stage, i.e. the database containing the identities that are authorised to gain remote control of the slave mobile communication device 102. This processing determines whether the detected access code matches the access code that is stored with the corresponding identity of the master mobile communication device 104.

After successful validation of the detected access code, the slave mobile communication device 102 grants remote control to the master mobile communication device. A suitable notification 110 is transmitted 112 to the slave mobile communication device 102.

There are existing applications that also perform the same function of allowing a master mobile communication device to remote control a slave mobile communication device. One such application, TeamViewer®, assigns an identifier for the slave mobile communication device and generates a random access password. The identifier of the slave mobile communication device and the random access password is then entered into respective fields of TeamViewer® running in the master mobile communication device and submitted, whereby the master mobile communication device is then granted remote control over the slave mobile communication device.

The verification process of the master mobile communication device 104 is distinguished from that used by TeamViewer® as follows. TeamViewer® does not require for the master mobile communication device seeking remote access to the slave mobile communication device to be amongst a list of master mobile communication devices that are authorised to have remote control. As long as the master mobile communication device connects to the slave mobile communication device with the correct identifier assigned to the slave mobile communication device and the correct random access password, remote control is granted. It can thus be any master mobile communication device with the correct credentials of the identifier assigned to the slave mobile communication device and its random access password. In contrast, verification of the credentials of the master mobile communication device 104 requires for its identity to be registered in a database containing the identities of master mobile communication devices that are authorised to gain remote control of the slave mobile communication device 102.

The embodiment shown in FIG. 1 supports an implementation where the slave mobile communication device 102 analyses the signal 106 for presence of the access code and extracts the access code from the signal when detected. Such an implementation provides for a first use case where the signal 106 is a SMS with content containing at least the access code granting remote control of the slave mobile communication device 102.

In this first use case, the signal 106 serves not only to identify the master mobile communication device 104, but also obtains permission to be granted remote control of the slave mobile communication device 102, since the signal 106 contains the access code that grants remote control of the slave mobile communication device 102.

After the master mobile communication device 104 is granted remote control of the slave mobile communication device 102, the connection between the two devices allow data such as emails, contact information, SMS/text messages and memorandums stored in the slave mobile communication device 102 to be transferred to the master mobile communication device 104. Thus, to support the first use case, the master mobile communication device 104 should be a smart phone, i.e. a mobile device with an operating system, as a normal landline phone is typically not configured to receive such transferred data.

The data transfer is effected by the master mobile communication device 104 being allowed access to an operating system of the slave mobile communication device 102. The master mobile communication device 104 can send commands to the slave mobile communication device 102 through one of several ways. A first way uses an interactive voice response menu, whereby control options that are available are dictated by a speaker of the master mobile communication device 104. A microphone of the master mobile communication device 104 then receives voice commands and converts them into data commands. A second way uses a graphic user interface having multiple choice menus and selections for control on what information may be transferred from the slave mobile communication device 102 to the master mobile communication device 104. A third way allows direct access to a desktop or homescreen of the operation system of the slave mobile communication device 102, where the display of the master mobile communication device 104 is entirely replaced by the desktop or homescreen of the slave mobile communication device 102 or the desktop or homescreen of the slave mobile communication device 102 may be contained in a window of the desktop or homescreen of the master mobile communication device 104. Input entered in any one of the interactive voice response menu, the graphic user interface or directly on the desktop or homescreen of the operation system of the slave mobile communication device 102 are processed as commands targeted at the operation system of the slave mobile communication device 102. Such commands to the operation system of the slave mobile communication device 102 control one or more of intrinsic functions of the slave mobile communication device 102 (such as contact list storage, picture storage, telephone records, application download capability) or applications installed in the slave mobile communication device 102 (for instance banking and payment applications, chat applications and travel booking applications).

The application running on the slave mobile communication device 102 that facilitates the remote control includes data format conversion tools to cater for scenarios where the slave mobile communication device 102 and the master mobile communication device 104 each use different operation system formats. These tools are harnessed to packetize data such as missed calls made to the slave mobile communication device 102, unread SMS, emails, and other information as desired by the owner and relay them to the master mobile communication device 104 in a selected data format as per preferences set by the user, such as the data format supported by the master mobile communication device 104.

All data that the application processes, such as the identity of the master mobile communication device 104 and its access code is encrypted and stored, for instance in the database for recording all details of master mobile communication devices that are allowed remote control of the slave mobile communication device 102. In addition, the application includes security features to ensure that all data transmitted to the master mobile communication device 104 during the remote control is encrypted using a preassigned key. The data received in the master mobile communication device 104 has to be decrypted using the preassigned key. This guarantees security of sensitive information.

The slave mobile communication device 102 is also configured to send all data belonging to a certain category (e.g. SMS, emails) upon request by the master mobile communication device 104 or continuously, where any new data received by the slave mobile communication device 102 belonging to the selected category is automatically sent to the master mobile communication device 104 until a specified time-window preset on the slave mobile communication device 102 elapses, or until it is explicitly commanded to stop sending or relaying data to the master mobile communication device 104.

The application running on the slave mobile communication device 102 that facilitates the remote control of the slave mobile communication device 102 provides various levels of remote control access, where each level provides a boundary as to what data the master mobile communication device 104 can request to be transferred, along with which functions and applications of the slave mobile communication device 102 that the master mobile communication device 104 can remotely operate.

For instance, the first use case discussed above allows for data such as QR code of a flight web check in, a scan of a hotel reservation that provides rental car detail, route map and the address of the hotel to be transmitted by the slave mobile communication device 102. Additional examples of data that can be transferred include credit card details to enable effecting payments, a last prescription or a medical image scan/report.

An extension of the first use case provides for a higher level of remote control access, where the master mobile communication device 104 is allowed to invoke and use applications hosted on the slave mobile communication device 102.

In this first use extension case, the master mobile communication device 104 can use banking and payment applications on the slave mobile communication device 102 to make payment or banking operations that are absolutely urgent and cannot be postponed till the owner has physical access to their phone. The master mobile communication device 104 is able to use all applications, such as ticketing and merchant applications, and access all data on the slave mobile communication device 102. In addition, the master mobile communication device 104 can operate functions of the slave mobile communication device 102, e.g. erase data, load new applications, access/change settings.

The first use extension case is achieved through the concept of creating a structure of secure tunnels or a layered virtual private network (VPN) between the slave mobile communication device 102 and the master mobile communication device 104. With this, it is possible to access the slave mobile communication device 102 as if it were physically with the owner.

Figure 2:
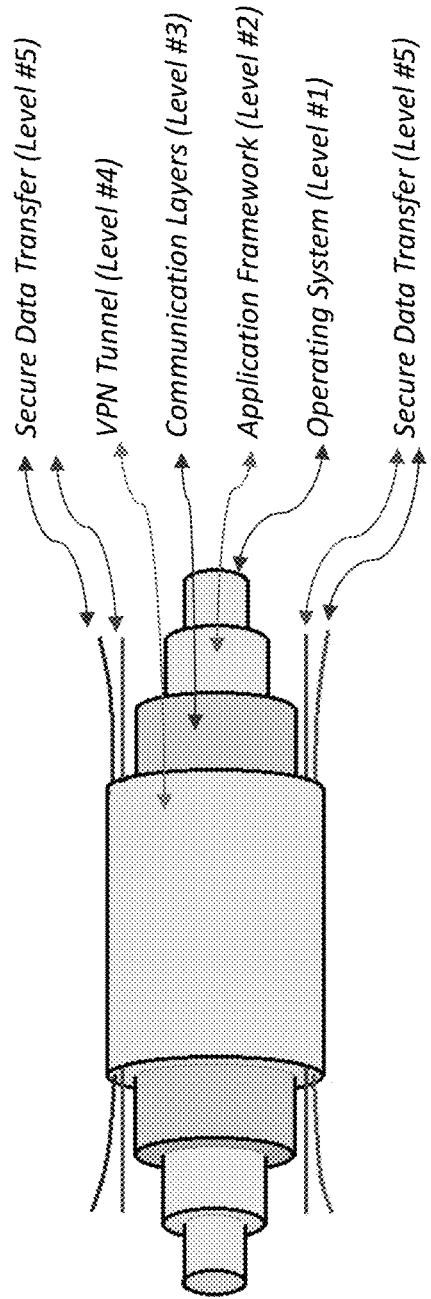
FIG. 2 shows a diagram illustrating security layers on which that remote control use cases of FIG. 1 lie.

FIG. 2 shows a diagram illustrating the concept of multilayer security pipes, which may be visualized as a set of concentric pipes. The innermost pipe (labelled level #1) represents the operating system layer security, followed by the security provided by the application framework layer (labelled level #2). All applications built on top of those layers have their own security. From a data communication perspective, the communication layers provide all protocols & security required for data transfer. The Virtual Private Network (VPN) layer (labelled level #4) provides for a highly secure tunnel ensuring that data transferred through the VPN is well protected and difficult to compromise. Once a VPN is established between the master mobile communication device 104 and the slave mobile communication device 102, the two devices are considered as privately connected and able to support the first use extension case.

Figure 3:
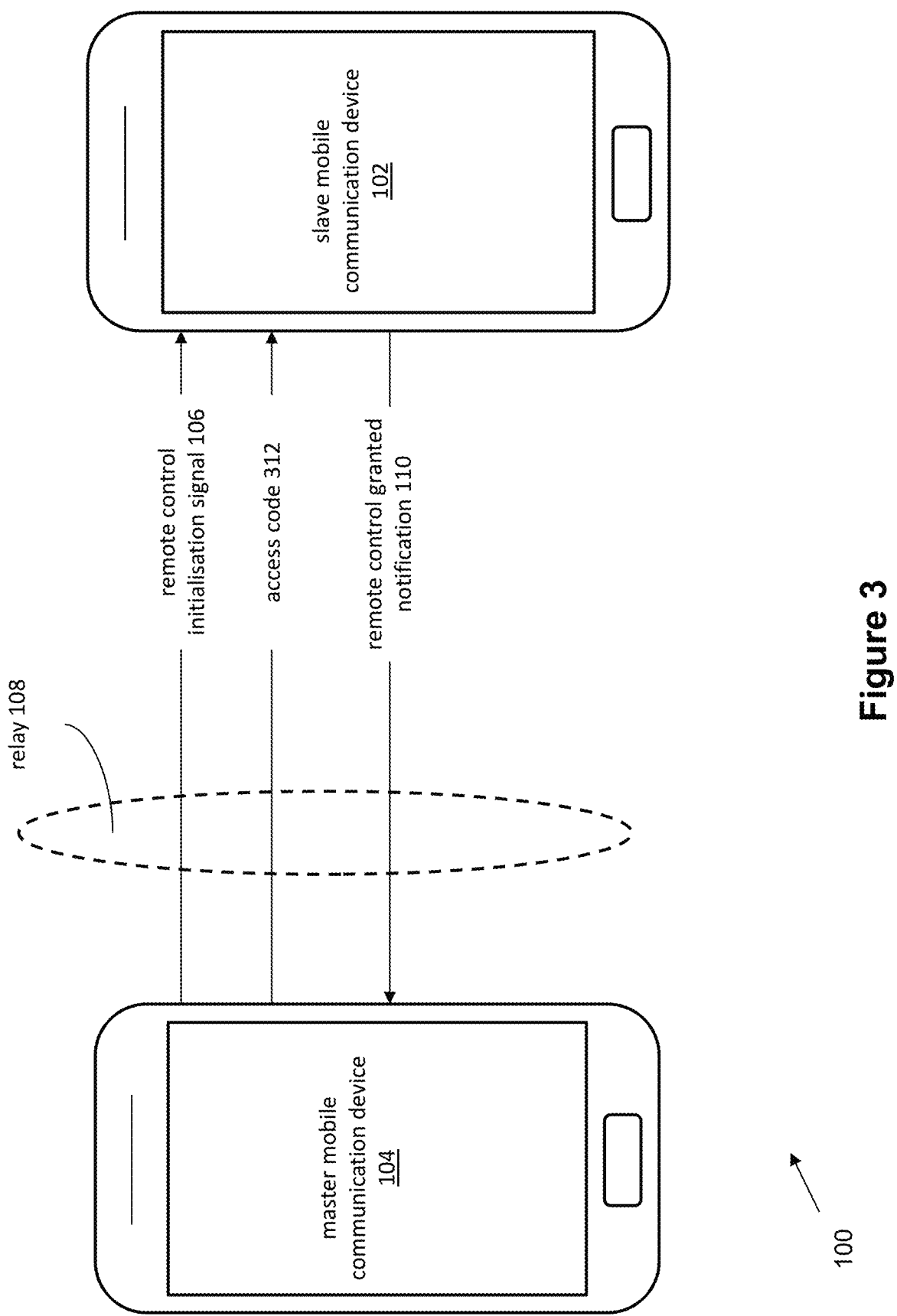
FIG. 3 shows a schematic of the system of FIG. 1, using a different communication exchange from the one shown in FIG. 1.

FIG. 3 shows a schematic of the system 100 of FIG. 1, using a communication exchange between the master mobile communication device 104 and the slave mobile communication device 102 that is different from the one shown in FIG. 1.

The main difference between the communication sequence in FIG. 3 and FIG. 1 is that in FIG. 3, the access code that grants remote control of the slave mobile communication device 102 to the master mobile communication device 104 is not contained in the signal 106. Rather, the access code 312 is separately received, where the slave mobile communication device 102 is configured to provide for an interval for the input of the access code 312 from the master mobile communication device 104. Even though the access code 312 is separately received from the signal 106, the slave mobile communication device 102 will realise that the access code 312 is paired with the signal 106 for being connected with the signal 106.

This interval provides for a variant of the first use case, whereby a first SMS that the master mobile communication device 104 sends to the slave mobile communication device 102, in respect of gaining remote control, serves to identify the master mobile communication device 104 to the slave mobile communication device 102. This first SMS may also include content that signifies to the slave mobile communication device 102 that remote control is sought. The slave mobile communication device 102 may then send (not shown) a second SMS to the master mobile communication device 104 to transmit the access code 312 to the slave mobile communication device 102.

The communication sequence in FIG. 3 is also used in a second use case where the signal 106 is a phone call made by the master mobile communication device 104.

When the application running on the slave mobile communication device 102 that facilitates the remote control of the slave mobile communication device 102 detects that the phone call is from a registered telephone number, the slave mobile communication device 102 will distinguish whether the master mobile communication device 104 making the call is in a normal phone call mode or seeking remote control mode by providing the interval for the master mobile communication device 104 to enter the access code 312. This interval happens before the onset of a ringing tone. If the access code 312 is omitted, the master mobile communication device 104 will receive the ringing tone, whereby a normal phone conversation sequence will occur between the master mobile communication device 104 and the slave mobile communication device 102.

If the access code 312 is provided within the interval, the slave mobile communication device 102 will validate the access code 312. Successful validation of the access code 312 grants the master mobile communication device 104 remote control of the slave mobile communication device 102.

Thus, to support the second use case, the master mobile communication device 104 can be a smart phone, similar to the first use case. However, in the second use case, the master mobile communication device 104 can also be a normal landline phone. During this interval, the master mobile communication device 104, being either a smart phone or a landline phone, provides the access code 312 in pulse or dual tone multi frequency formats (DTMF). For instance, the access code 312 may be an 8 digit PIN. It is also possible that the access code 312 is spoken during the interval, whereby the slave mobile communication device 102 uses voice recognition to convert the spoken access code 312 into data. Accordingly, the slave mobile communication device 102 is configured to decode the access code provided in one or more of pulse, dual tone multi frequency and speech formats.

As the second use case is mainly to cater for remote control through a normal landline phone, the interface through which the remote control is conducted uses an interactive voice response (IVR) menu through which the master mobile communication device 104 requests information or data from the slave mobile communication device 102. This could take the form of the slave mobile communication device 102 reading out requested data, such as SMS/Text messages, and/or names and numbers of the parties in its missed call registry.

Most two factor authentication schemes require the input of an OTP (one time password) received in a SMS sent by a service provider. The OTP is required before a requested service is made available. Without the phone registered to receive this OTP, the owner can be severely inconvenienced for not being able to login and avail of the service, which could range from booking tickets or carrying out banking related functions. The second use case allows the owner to access the OTP from the phone that the owner has forgotten to bring (i.e. the slave mobile communication device 102) and perform the required login and subsequently avail themselves to the required service(s). In addition, the owner may request for specific information from the slave mobile communication device 102—such as a contact number, reminders, or the day's appointments, as allowed in the settings for the application running on the slave mobile communication device 102 that facilitates the remote control of the slave mobile communication device 102. It is readily evident that the features that the second use case provides are extremely useful and enables users to access important messages and information on an inadvertently forgotten phone.

Referring to FIGS. 1 and 3, the access code includes a sequence having one or more of symbols, letters and digits. This also applies in the scenario where the master mobile communication device 104 is a landline phone because the access code may be dictated into the master mobile communication device 104 for conversion into data using text recognition capability of the slave mobile communication device 102.

As a further safety precaution, remote control of the slave mobile communication device 102, as set out in FIGS. 1 and 3, requires a second factor authentication. The communication sequence for the second factor authentication is illustrated with reference to FIG. 4. When second factor authentication is implemented, its successful validation is required before remote control of the slave mobile communication device 102 is granted.

Second factor authentication initiates with the slave mobile communication device 102 transmitting a message, to the master communication device, prompting 414 for input of an authentication code. The authentication code is typically provided by the owner of the slave mobile communication device 102 during installation of the application that facilitates the remote control of the slave mobile communication device 102. The authentication code could be, for example, the last 4 digits of the owner's debit card, date of birth in DDMM (or any other preset) format, or the last 4 digits of the owner's car registration number. The authentication code 416 is received from the master mobile communication device 104. Remote control of the slave mobile communication device 102 is permitted after the successful validation of the detected access code and successful validation of the received authentication code 416. The notification 110 (see FIGS. 1 and 3) that remote control of the slave mobile communication device 102 is granted is then transmitted to the master mobile communication device 104.

Even before the communication sequence shown in FIGS. 1 and 3 occur, pre-registration has to be performed. That is, the identity of the master mobile communication device 104 and the access code to grant remote control of the slave mobile communication device 102 have to be registered with the database of the slave mobile communication device 102 that contains identities of master mobile communication devices that are authorized to gain remote control.

In a first pre-registration approach, the telephone number used to call the slave mobile communication device 102 is entered into a user interface provided by the slave mobile communication device 102, along with an access code used to gain remote control of the slave mobile communication device. Such a telephone number is registered with the slave mobile communication device 102 during installation of the application that facilitates the remote control of the slave mobile communication device 102. This first approach caters for allowing a readily available landline phone, such as at a workplace, to remotely control the slave mobile communication device 102.

In a second pre-registration approach, a new telephone number may be remotely registered with the slave mobile communication device 102 by sending one or more SMS to the slave mobile communication device 102. In the case where more than one SMS is used, the first SMS contains a registration code. In one implementation, the telephone number of the master mobile communication device 104 is provided in the message containing the registration code or in a subsequent message. In another implementation, where the sender of the message containing the registration code is meant to be a master mobile communication device 104, the telephone number of the sender is automatically detected by caller ID for registration.

These one or more SMS, when received by the slave mobile communication device 102, are automatically read and analysed. If all fields get verified, the new number will get added to the list of registered numbers maintained by the slave mobile communication device 102. Once done, the master mobile communication device 104 calls from the newly registered telephone number and will be granted remote control of the slave mobile communication device 102 after access code verification.

This second pre-registration approach provides a useful facility to the owner of the slave mobile communication device 102—that they can access their phone remotely from an entirely new telephone number. Since a strong ID verification process is in place (including the optional second factor authentication) is used to establish the authenticity of the caller, all information and data is securely held, and communicated only to a valid caller. The application running on the slave mobile communication device 102 that facilitates the remote control of the slave mobile communication device 102 provides options to keep the newly registered telephone number as a one-time calling option or a persisted number that can be used multiple times. A 'one-time' option should be chosen when the master mobile communication device 104 is borrowed expressly to read important messages.

Since a number of identities (such as telephone numbers) may be registered with the application, remote control as described above with reference to FIGS. 1 and 2 is not restricted to a single user, but may be extended to a number of parties, such as several members of a family. The slave mobile communication device 102 may thus be used as a common information repository and messaging centre that can be used by the several members of a family. Any member of the family can store messages in the slave mobile communication device 102 which can then be read by other members in the family, thereby making it convenient to communicate and share information amongst family members.

Figure 4:
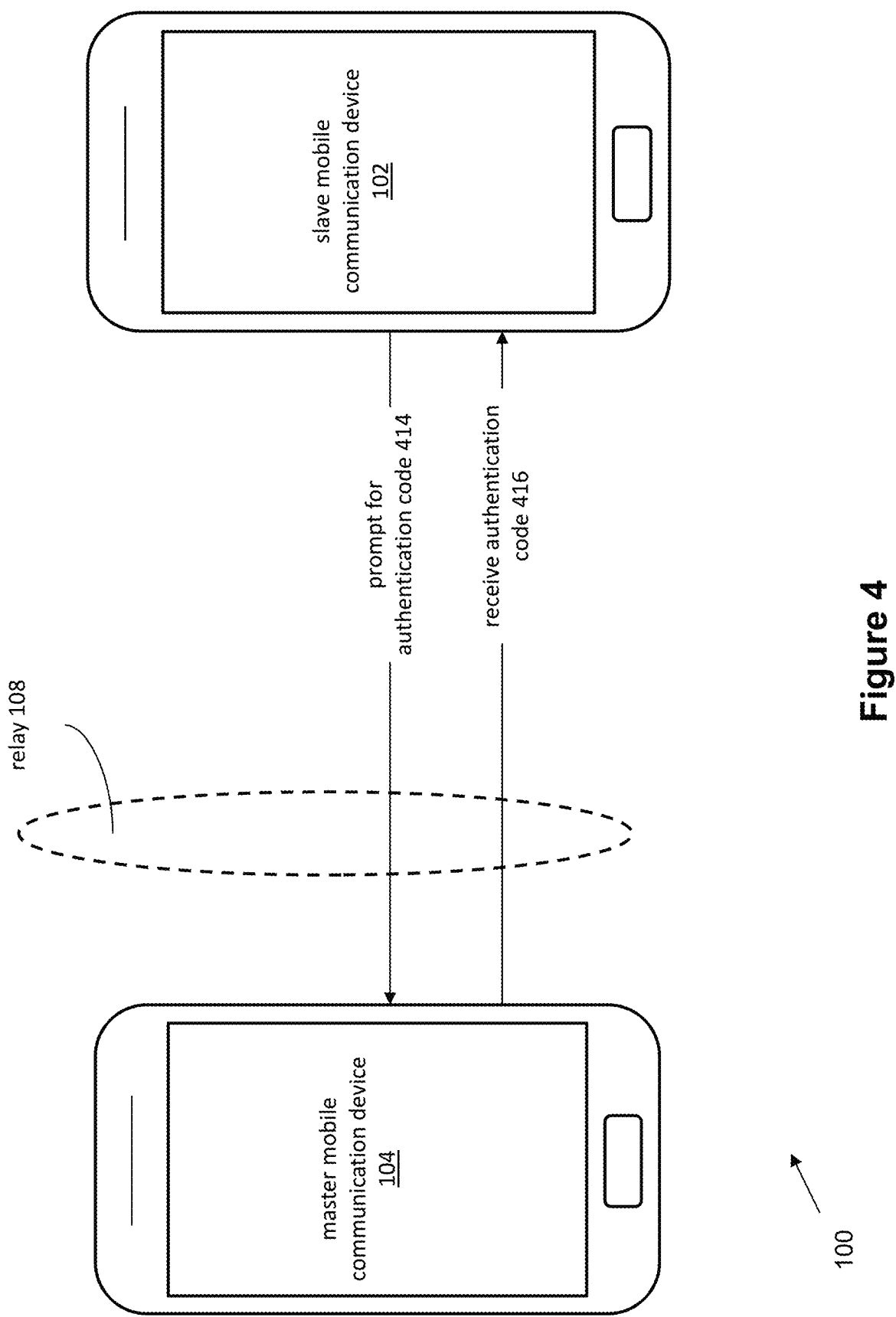
FIG. 4 shows a communication sequence for second factor authentication used in the remote control described with reference to FIGS. 1 and 3.
Figure 5:
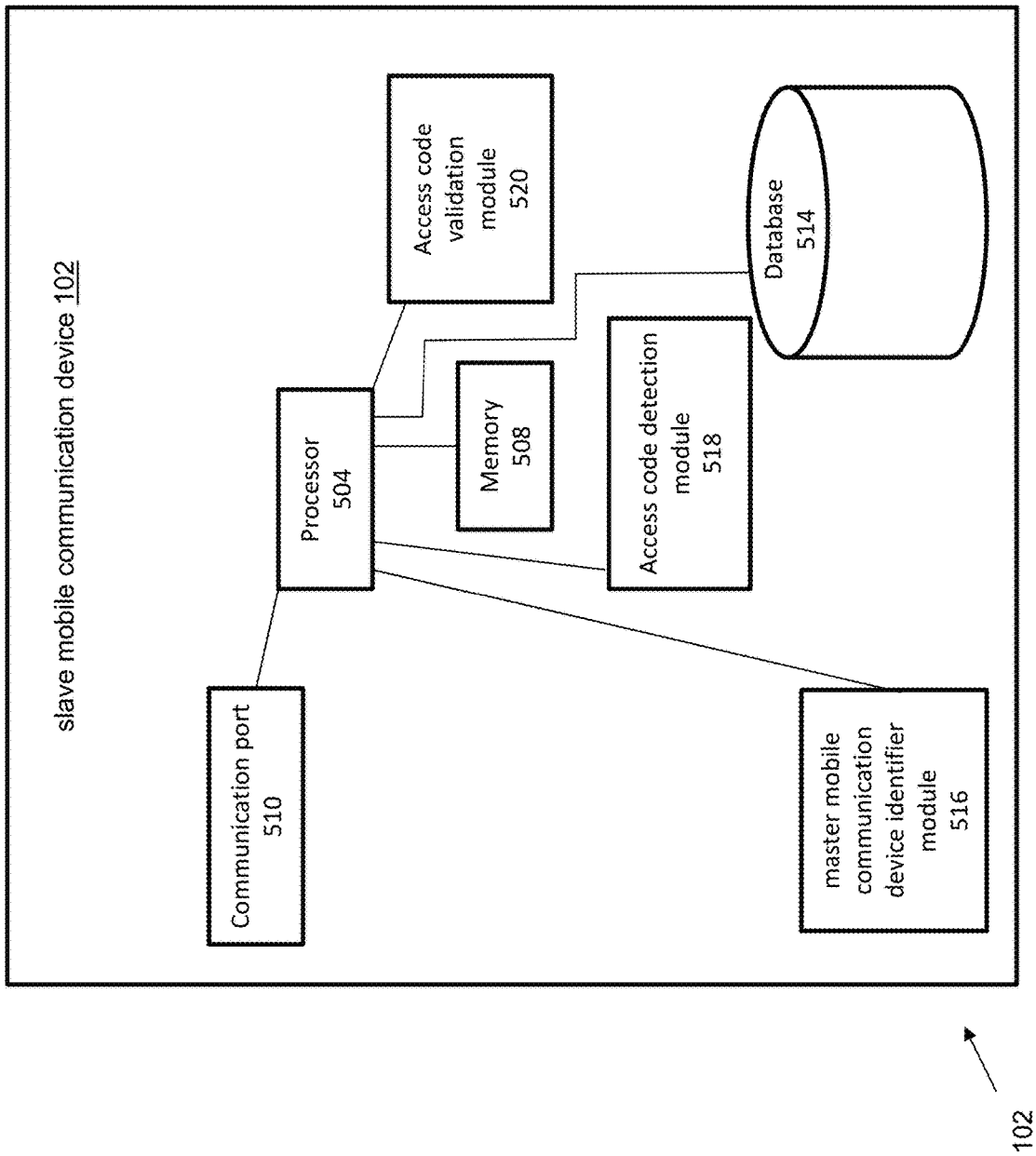
FIG. 5 provides a schematic diagram of functional modules present in the slave mobile communication device of FIGS. 1, 3 and 4.

FIG. 5 provides a schematic diagram of functional modules present in the slave mobile communication device 102 of FIGS. 1, 3 and 4.

The incentive program manager 102 further includes a processor 504, a memory 508, a communication port 810, a master mobile communication device identifier module 516, a database 514, an access code detection module 518 and an access code validation module 520.

Each of the memory 508, the communication port 810, the master mobile communication device identifier module 516, the database 514, the access code detection module 518 and the access code validation module 520 is coupled to the processor 504, so that their respective operations can be controlled by the processor 504. The memory 508 stores computer program code that the processor 504 compiles to have each of the communication port 810, the master mobile communication device identifier module 516, the database 514, the access code detection module 518 and the access code validation module 520 perform their respective functions.

Each of the master mobile communication device identifier module 516, the access code detection module 518 and the access code validation module 520 can be implemented using one or more processors present in the slave mobile communication device 102.

With reference to FIGS. 1 and 3, the communication port 510 is configured to receive the signal 106 effected by the master mobile communication device 104 to initialise remote control of the slave mobile communication device 102. The master mobile communication device identifier module 516 is configured to establish an identity of the master mobile communication device 104 in response to reception of the signal 106. The master mobile communication device identifier module 516 is also configured to determine whether the identity is registered in the database 514 containing identities that are authorised to gain remote control of the slave mobile communication device 102.

The access code detection module 518 is configured to detect whether the signal 106 is paired with an access code granting remote control of the slave mobile communication device 102. This detection is performed upon successful determination of the identity of the master mobile communication device 104.

The access code validation module 520 is configured to validate the detected access code. The access code validation module 520 then grants remote control of the slave mobile communication device 102 to the master mobile communication device 104 after successful validation of the detected access code.

Figure 6:
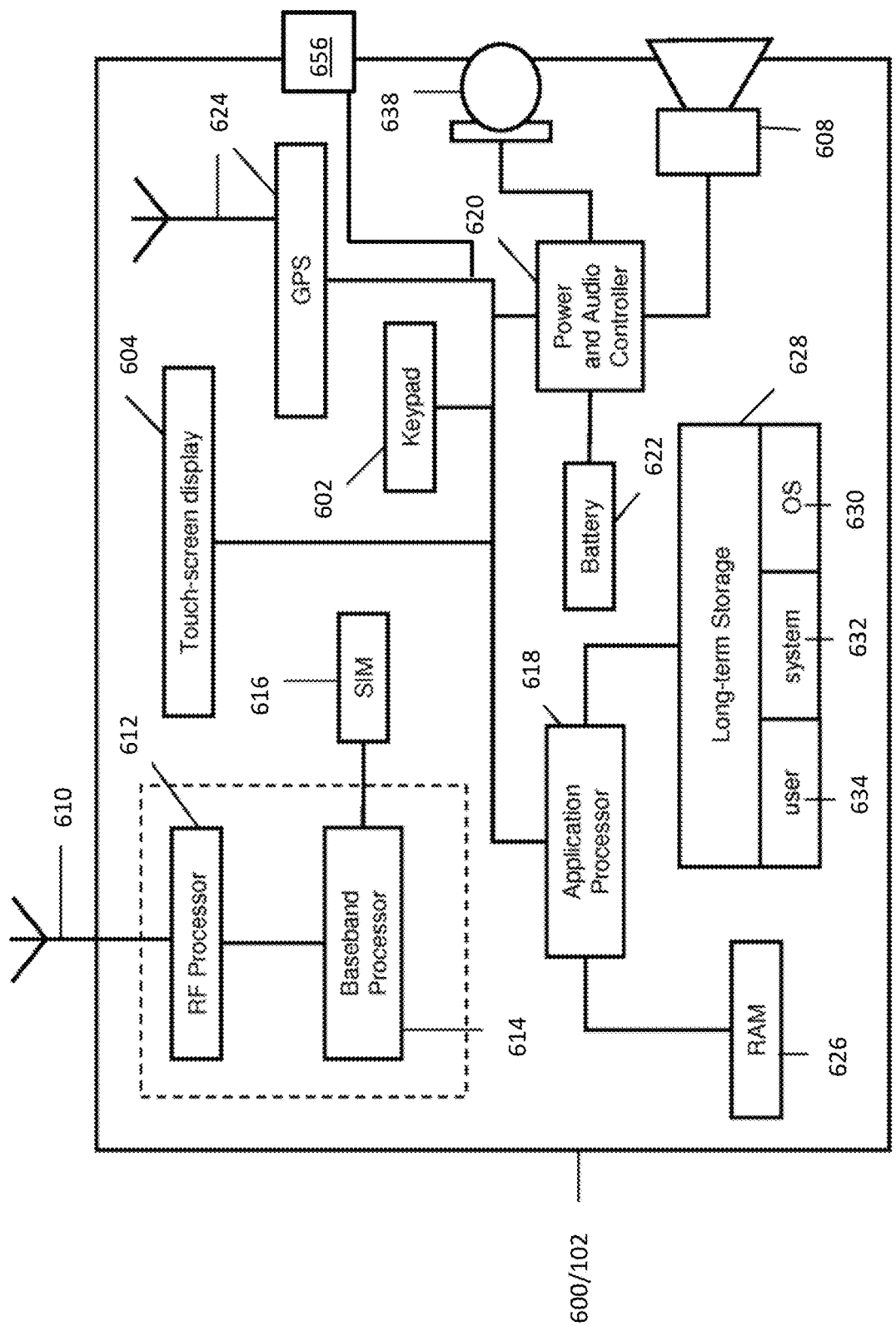
FIG. 6 is a schematic of a wireless device used to implement the slave mobile communication device shown in FIGS. 1, 3 and 4.

FIG. 6 is a schematic of a wireless device 600 that may be utilized to implement the slave mobile communication device 102 or the master mobile communication device 104 shown in FIGS. 1, 3 and 4.

The wireless device 600 comprises a keypad 602, a touch-screen 604, a microphone 638, a speaker 608 and an antenna 610. The wireless device 600 is capable of being operated by a user to perform a variety of different functions, such as, for example, hosting a telephone call, sending an SMS message, browsing the Internet, sending an email and providing satellite navigation.

The wireless device 600 comprises hardware to perform communication functions (e.g. telephony, data communication), together with an application processor and corresponding support hardware to enable the wireless device have other functions, such as, messaging, Internet browsing, email functions and the like. The communication hardware is represented by the RF processor 612 which provides an RF signal to the antenna 610 for the transmission of data signals, and the receipt therefrom. Additionally provided is a baseband processor 614, which provides signals to and receives signals from the RF Processor 612. The baseband processor 614 also interacts with a subscriber identity module 616, as is well known in the art. The communication subsystem enables the wireless device 600 to communicate via a number of different communication protocols including 3G, 4G, GSM, WiFi, Wi-fi direct, Near Field Communication (NFC), Bluetooth™ and/or CDMA.

The keypad 602 and the touch-screen 604 are controlled by an application processor 618. A power and audio controller 620 is provided to supply power from a battery 622 to the communication subsystem, the application processor 618, and the other hardware. The power and audio controller 620 also controls input from the microphone 638, and audio output via the speaker 608. Also provided is a global positioning system (GPS) antenna and associated receiver element 624 which is controlled by the application processor 618 and is capable of receiving a GPS signal for use with a satellite navigation functionality of the wireless device 600.

In order for the application processor 618 to operate, various different types of memory are provided. Firstly, the wireless device 600 includes Random Access Memory (RAM) 626 connected to the application processor 618 into which data and program code can be written and read from at will. Code placed anywhere in RAM 626 can be executed by the application processor 618 from the RAM 626. RAM 626 represents a volatile memory of the wireless device 600.

Secondly, the wireless device 600 is provided with a long-term storage 628 connected to the application processor 618. The long-term storage 628 comprises three partitions, an operating system (OS) partition 630, a system partition 632 and a user partition 634. The long-term storage 628 represents a non-volatile memory of the wireless device 600.

In the present example, the OS partition 630 contains the firmware of the wireless device 600 which includes an operating system. Other computer programs may also be stored on the long-term storage 628, such as application programs, and the like. In particular, application programs which are mandatory to the wireless device 600, such as, in the case of a smartphone, communications applications and the like are typically stored in the system partition 632. The application programs stored on the system partition 632 would typically be those which are bundled with the wireless device 600 by the device manufacturer when the wireless device 600 is first sold. Application programs which are added to the wireless device 600 by the user would usually be stored in the user partition 634.

As stated, the representation of FIG. 6 is schematic. In practice, the various functional components illustrated may be substituted into one and the same component. For example, the long-term storage 628 may comprise NAND flash, NOR flash, a hard disk drive or a combination of these.

The wireless device 600 may also have an image capturing module 656. The image capturing module, together with a suitable application, may be used to capture/scan QR codes and process the data embedded in the QR code. To have the wireless device 600 operate in a slave mode, the at least one processor (e.g. application processor 618) and the at least one memory (e.g. RAM 626, long-term storage 628) with its computer program code are configured to cause the mobile communication device 102 at least to: receive, through the communication port (the communication hardware represented by the RF processor 612 that is coupled to the antenna 610 and the baseband processor 614 to which the RF processor 612 is in communication), a signal effected by a master mobile communication device to initialise remote control of the mobile communication device 102. The application processor 618 is further configured to establish an identity of the master mobile communication device in response to reception of the signal and determines whether the identity is registered in a database containing identities that are authorised to gain remote control of the mobile communication device 102. Upon successful identity determination, the application processor 618 is configured to detect whether the signal is paired with an access code granting remote control of the mobile communication device 102. The application processor 618 is further configured to validate the detected access code and grant remote control of the mobile communication device 102 to the master mobile communication device after successful validation of the detected access code.

The mobile communication device 102 is further configured to, before receiving the signal from the master mobile communication device: register the identity of the master mobile communication device and the access code that the master mobile communication device uses to gain remote control of the mobile communication device 102 with the database. The mobile communication device 102 is further configured to provide for an interval for the input of the access code.

The mobile communication device 102 is further configured to decode the access code provided in one or more of pulse, dual tone multi frequency and speech formats. The mobile communication device 102 is further configured to: analyse the signal for presence of the access code; and extract the access code from the signal. The access code comprises a sequence having one or more of symbols, letters and digits.

Before granting remote control to the master mobile communication device, the mobile communication device 102 is further configured to: transmit a message to the master communication device prompting for input of an authentication code; receive the authentication code from the master communication device; and successfully validate the received authentication code.

The granted remote control comprises having the mobile communication device 102 being configured to: allow access to an operating system of the mobile communication device by processing commands targeted at the operating system of the mobile communication device resulting from input entered in any one of: an interactive voice response menu, a graphic user interface, or directly on a desktop of the operation system of the mobile communication device 102. The mobile communication device 102 is further configured to: encrypt data transmitted to the master mobile communication device during the remote control.

The long term storage 628 provides a non-transitory computer readable medium for storing a program that when installed into the mobile communication device 102 programs the mobile communication device 102 into a slave mode for remote control by a master mobile communication device. In entering the slave mode, the mobile communication device 102 is configured to receive a signal effected by the master mobile communication device to initialise remote control of the mobile communication device 102; establish an identity of the master mobile communication device in response to reception of the signal; determine whether the identity is registered in a database containing identities that are authorised to gain remote control of the mobile communication device 102; detect, upon successful identity determination, whether the signal is paired with an access code granting remote control of the mobile communication device 102; validate the detected access code; and grant remote control of the mobile communication device 102 to the master mobile communication device after successful validation of the detected access code.

To have the wireless device 600 operate in a master mode, the at least one processor (e.g. application processor 618) and the at least one memory (e.g. RAM 626, long-term storage 628) with its computer program code are configured to cause the mobile communication device 104 at least to transmit, through the communication port (the communication hardware represented by the RF processor 612 that is coupled to the antenna 610 and the baseband processor 614 to which the RF processor 612 is in communication), a signal to initialise remote control of the slave mobile communication device. The mobile communication device 104 is further configured to pair the signal with an access code granting remote control of the slave electronic mobile communication device and receive a notification of grant of the remote control after validation of the access code by the slave communication device. The mobile communication device 104 is then configured to access an operating system of the slave mobile communication device through input entered in any one of: an interactive voice response menu, a graphic user interface, or directly on a desktop of the operation system of the slave mobile communication device.

The mobile communication device 104 is further configured to send a request to the slave mobile communication device to register an identity with which the mobile communication device 104 uses to gain remote control of the slave mobile communication device.

Before the mobile communication device 104 is granted remote control of the slave mobile communication device, the mobile communication device 104 is configured to: receive a message from the slave mobile communication device prompting for input of an authentication code; transmit the authentication code to the slave communication device; and receive a notification of successful validation of the transmitted authentication code from the slave mobile communication device.

Figure 7:
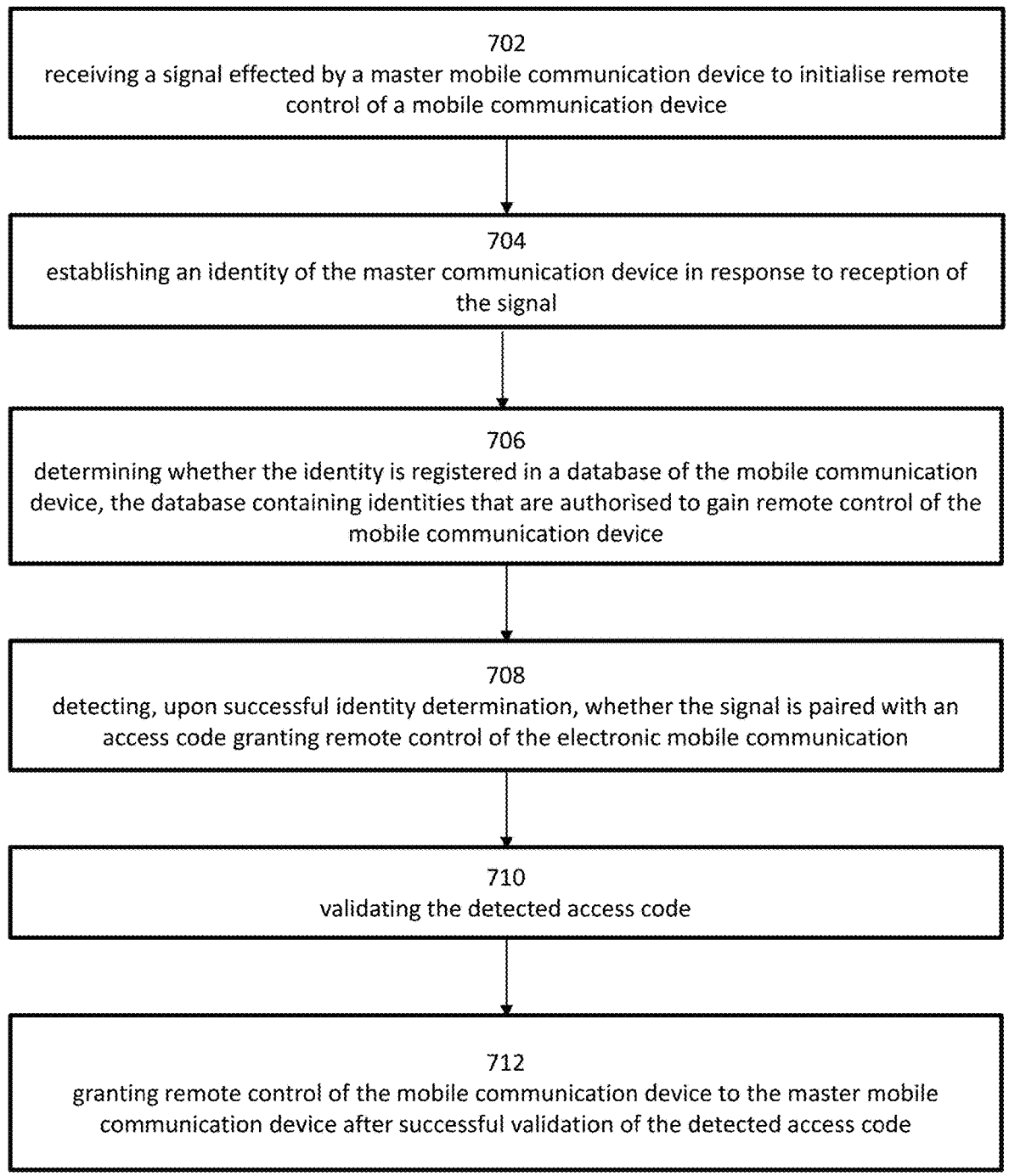
FIG. 7 shows a flowchart depicting steps of a method of effecting remote control of a mobile communication device programmable into a slave mode by a master mobile communication device.

FIG. 7 shows a flowchart depicting steps of a method 700 of programming a mobile communication device programmable into a slave mode, so that the mobile communication device can be remote controlled by a master mobile communication device. The method 700 is performed by the wireless device 600 of FIG. 6.

The method 700 includes a first step 702 of receiving a signal effected by the master mobile communication device to initialise remote control of the mobile communication device.

A second step 704 involves establishing an identity of the master communication device in response to reception of the signal.

A third step 706 involves determining whether the identity is registered in a database of the mobile communication device, the database containing identities that are authorised to gain remote control of the mobile communication device.

A fourth step 708 involves detecting, upon successful identity determination, whether the signal is paired with an access code granting remote control of the mobile communication device.

A fifth step 710 involves validating the detected access code.

A sixth step 712 involves granting remote control of the mobile communication device to the master mobile communication device after successful validation of the detected access code.

Some portions of the above description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on a computer effectively results in an apparatus that implements the steps of the preferred method.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A mobile communication device programmable into a slave mode for remote control by a master mobile communication device, the mobile communication device comprising:

at least one processor;

at least one memory including computer program code; and a communication port coupled to the processor, the at least one memory and the computer program code configured to, with the at least one processor, cause the mobile communication device at least to:

receive, through the communication port, a signal effected by the master mobile communication device to initialize remote control of the mobile communication device;

establish an identity of the master mobile communication device in response to reception of the signal;

determine whether the identity is registered in a database containing identities that are authorized to gain remote control of the mobile communication device;

detect, upon successful identity determination, whether the signal is paired with an access code granting remote control of the mobile communication device;

validate the detected access code; and grant remote control of the mobile communication device to the master mobile communication device after successful validation of the detected access code, wherein granting of the remote control further requires the mobile communication device to be configured to:

transmit a message, to the master communication device, prompting for input of an authentication code;

receive the authentication code from the master communication device; and successfully validate the received authentication code.

2. The mobile communication device of claim 1, wherein the mobile communication device is further configured to, before receiving the signal from the master mobile communication device:

register the identity and the access code with the database.

3. The mobile communication device of claim 1, wherein the mobile communication device is further configured to:

provide for an interval for the input of the access code.

4. The mobile communication device of claim 1, wherein the mobile communication device is further configured to decode the access code provided in one or more of pulse, dual tone multi frequency and speech formats.

5. The mobile communication device of claim 1, wherein the mobile communication device is further configured to:

analyze the signal for presence of the access code; and extract the access code from the signal.

6. The mobile communication device of claim 1, wherein the access code comprises a sequence having one or more of symbols, letters and digits.

7. A mobile communication device programmable into a slave mode for remote control by a master mobile communication device, the mobile communication device comprising:
- at least one processor;
- at least one memory including computer program code; and
- a communication port coupled to the processor,
- the at least one memory and the computer program code configured to, with the at least one processor, cause the mobile communication device at least to:
  - receive, through the communication port, a signal effected by the master mobile communication device to initialize remote control of the mobile communication device;
  - establish an identity of the master mobile communication device in response to reception of the signal;
  - determine whether the identity is registered in a database containing identities that are authorized to gain remote control of the mobile communication device;
  - detect, upon successful identity determination, whether the signal is paired with an access code granting remote control of the mobile communication device;
  - validate the detected access code; and
  - grant remote control of the mobile communication device to the master mobile communication device after successful validation of the detected access code,
    - wherein the granted remote control comprises having the mobile communication device being further configured to:
      - allow access to an operating system of the mobile communication device by processing commands targeted at the operating system of the mobile communication device resulting from input entered in any one of: an interactive voice response menu, a graphic user interface, or directly on a desktop of the operation system of the mobile communication device.

8. The mobile communication device of claim 1, wherein the mobile communication device is further configured to:
- encrypt data transmitted to the master mobile communication device during the remote control.

9. A method to effect remote control of a mobile communication device programmable into a slave mode by a master mobile communication device, the method comprising:
- receiving a signal effected by the master mobile communication device to initialize remote control of the mobile communication device;
- establishing an identity of the master communication device in response to reception of the signal;
- determining whether the identity is registered in a database of the mobile communication device, the database containing identities that are authorized to gain remote control of the mobile communication device;
- detecting, upon successful identity determination, whether the signal is paired with an access code granting remote control of the mobile communication device;
- validating the detected access code; and
- granting remote control of the mobile communication device to the master mobile communication device after successful validation of the detected access code,
  - wherein the granted remote control comprises:
    - allowing access to an operating system of the mobile communication device by processing commands targeted at the operating system of the mobile communication device resulting from input entered in any one of: an interactive voice response menu, a graphic user interface, or directly on a desktop of the operation system of the mobile communication device.

10. The method of claim 9, further comprising:
- receiving a request to register the source and the access code with the database before receiving the signal from the master mobile communication device.

11. A method to effect remote control of a mobile communication device programmable into a slave mode by a master mobile communication device, the method comprising:
- receiving a signal effected by the master mobile communication device to initialize remote control of the mobile communication device;
- establishing an identity of the master communication device in response to reception of the signal;
- determining whether the identity is registered in a database of the mobile communication device, the database containing identities that are authorized to gain remote control of the mobile communication device;
- detecting, upon successful identity determination, whether the signal is paired with an access code granting remote control of the mobile communication device;
- validating the detected access code; and
- granting remote control of the mobile communication device to the master mobile communication device after successful validation of the detected access code,
  - wherein granting of the remote control further comprises:
    - transmitting a message, to the master communication device, prompting for input of an authentication code;
    - receiving the authentication code from the master communication device; and
    - validating the received authentication code successfully.

12. The method of claim 9, further comprising:
- encrypting data transmitted to the master mobile communication device during the remote control.

13. A mobile communication device programmable into a master mode to remote control a slave mobile communication device, the mobile communication device comprising:
- at least one processor;
- at least one memory including computer program code; and
- a communication port coupled to the processor,
- the at least one memory and the computer program code configured to, with the at least one processor, cause the mobile communication device at least to:
  - transmit, through the communication port, a signal to initialize remote control of the slave mobile communication device;
  - pair the signal with an access code granting remote control of the slave mobile communication device;
  - receive a notification of grant of the remote control after validation of the access code by the slave communication device; and
  - access an operating system of the slave mobile communication device through input entered in any one of: an interactive voice response menu, a graphic user interface, or directly on a desktop of the operation system of the slave mobile communication device, wherein granting of the remote control further requires for the mobile communication device to be configured to:
- receive a message from the slave mobile communication device prompting for input of an authentication code;
- transmit the authentication code to the slave mobile communication device; and
- receive a notification of successful validation of the transmitted authentication code from the slave mobile communication device.

14. The mobile communication device of claim 13, wherein the mobile communication device is further configured to:
- send a request to the slave mobile communication device to register an identity with which the mobile communication device uses to gain remote control of the slave mobile communication device.

\* \* \* \* \*